XR 3,325,743

X 89195

X 89213

June 13, 1967 A. S. BLUM 3,325,743

BIMORPH FLEXURAL ACOUSTIC AMPLIFIER

Filed Dec. 23, 1965

INVENTOR.
Asher S. Blum
BY
Douglas D. Drake
Attorney

3325743
OR IN 330/5

3,325,743

BIMORPH FLEXURAL ACOUSTIC AMPLIFIER

Asher S. Blum, Chicago, Ill., assignor to Zenith Radio Corporation, Chicago, Ill., a corporation of Delaware Filed Dec. 23, 1965, Ser. No. 516,020
15 Claims. (Cl. 330—5)

This invention relates to solid state acoustic amplifiers. More specifically, it pertains to acoustic amplifiers of the type in which amplification of an acoustic wave is achieved by the use of a piezoelectric semiconductive element. While the invention is useful for achieving amplification of acoustic waves, i.e., mechanical wave vibrations or coherent elastic waves, of any frequency, it is particularly advantageous in its application at ultrasonic frequencies and will, therefore, be described in that environment.

It is known that certain semiconductor materials, such as single crystals of cadmium sulfide, also exhibit piezoelectric properties. When such a crystal is provided with a pair of open-circuited surface electrodes and subjected to a mechanical strain, an electric field is generated in the material and a resulting potential difference is developed between the surface electrodes. Conversely, a mechanical strain is developed in the unstressed material in response to the application of a voltage between the surface electrodes. Application of an alternating signal between the electrodes results in alternating expansions and contractions in the material and, conversely, when the material is subjected to periodic mechanical wave vibration a corresponding electrical signal is developed between the electrodes. In a given device, the electric field may be oriented either longitudinally or transversely with respect to a selected geometrical axis.

When a single crystal of piezoelectric semiconductor material is formed as a bar of a length corresponding to several wavelengths at a predetermined signal frequency, and when one end of the bar is subjected to mechanical vibration at the signal frequency, the mechanical vibrations are propagated along the bar as acoustic waves in the form of alternating localized expansions and contractions or other deformations in the material. The acoustic waves may be of any of several modes or combinations thereof; typical possible modes are represented by longitudinal or compressional waves, shear waves, Rayleigh waves and flexural waves. It is known that when, at the same time, a steady state electrical biasing field of an appropriate magnitude and polarity is impressed along the length of the material as by connecting a D.C. voltage source between the ends of the bar, acoustic wave amplification is obtained.

It has been proposed that a solid state acoustic amplifier comprise such a piezoelectric semi-conductive bar in association with an input transducer at one end for imparting compressional-wave vibrations to the bar and an output transducer at the other end for converting the amplified compressional wave vibrations to an electrical output signal. In use, the device may serve as a miniaturized intermediate frequency amplifying stage in an amplitude modulation or frequency modulation radio receiver. However, such compressional-wave solid state acoustic amplifiers, in the present state of the art, are not sufficiently frequency selective to be attractive for use in many applications. Moreover, the electromechanical conversion efficiency is not as high and the power dissipation not as low as might be desired in particular cases. Similar shortcomings have been found with respect to transverse-wave devices.

Of particular note is a prior proposal that a piezoelectric semiconductive bar be vibrated in a flexural mode by applying counterphase mechanical driving impulses to its upper and lower portions. While this approach is attractive in certain respects, difficulty is encountered in achieving maximum desired performance by reason of the nature of the charge displacements induced in the bar. Specifically, desired longitudinal field effects are undesirably reduced by transverse field effects.

Accordingly, it is a primary object of the present invention to provide a new and improved solid state acoustic amplifier;

It is a further object of the invention to provide a new and improved solid state acoustic amplifier which is frequency selective and may be tuned to provide selective amplification of input signal frequencies over a substantial tuning range;

Yet another object of the invention is to provide a new and improved tunable solid state acoustic amplifier which operates with a materially lower power dissipation than with prior devices of this type.

A more specific object of the invention is to provide a new and improved solid state acoustic amplifier which is adaptable for use as an intermediate frequency amplifying stage in a frequency modulation or amplitude modulation radio receiver or the like.

A flexural-mode solid-state acoustic signal translating device implementing the invention includes an acoustic wave propagating element of a piezoelectric semiconductor material and of a length in the direction of acoustic wave propagation which is large relative to the wavelength, in the material, of the acoustic waves being translated. The element comprises a pair of piezoelectric semiconductive segments in transverse juxtaposition, relative to the direction of wave propagation, as well as means coupled to the wave propagating element and responsive to an input signal for simultaneously impressing counterphased acoustic waves on the piezoelectric segments to induce flexural-mode vibrations on the wave propagating element with a resultant development of bunches of electric charge in like phase in transversely aligned regions of the juxtaposed segments. The translating device further includes means coupled to the wave propagating element and responsive to flexural-mode vibrations for developing an output signal corresponding to the input signal together with means for impressing a steady state biasing voltage across the wave propagating element in the direction of wave propagation to establish in the material a flow in the direction of wave propagation of electric charge carriers which interact with the bunches of electric charge and modify the amplitude of the flexural-mode vibration.

The features of the invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figure 1:
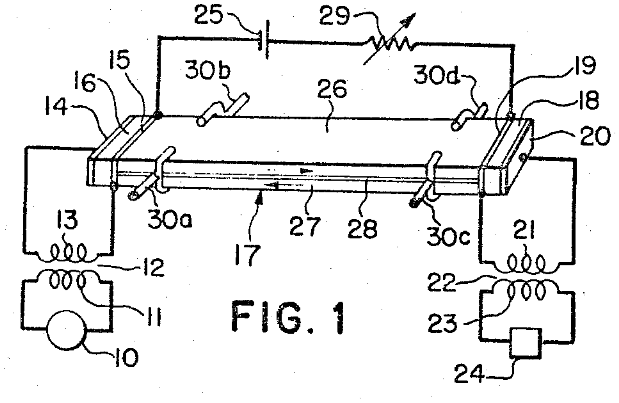
FIGURE 1 is a partly schematic perspective view of one embodiment of a flexural-mode acoustic amplifier.

In FIGURE 1, an input signal source 10, which may for example constitute the heterodyne converter or so-called first detector of a superheterodyne AM or FM radio receiver, is coupled across the primary winding 11 of an input coupling transformer 12. The secondary winding 13 of transformer 12 is in turn coupled across the opposed surface electrodes 14 and 15 of a piezoelectric input transducer 16. Input transducer 16 is mechanically coupled to one end of an acoustic wave propagating device in the form of an elongated bar-shaped element 17 of piezoelectric semiconductive material such as cadmium sulfide. The output end of element 17 in turn is mechanically coupled to a piezoelectric output transducer 18.

The length of element 17 is large relative to the wavelength in the semiconductive material of waves propagated therein in response to the signal from source 10. That length preferably is ten to one or more hundred wavelengths, although it is not necessarily an integral number of wavelengths. For example, with element 17 composed of cadmium sulfide, the wavelength of the flexural wave in the material at 10.7 megacycles per second, a commonly employed intermediate frequency in FM broadcast receivers, is approximately .1918 millimeters, and an element 2 inches in length corresponds to about 265 wavelengths. The device preferably is thin in the transverse direction, having a typical thickness of about 0.004 inch.

The output electrodes 19 and 20 of output transducer 18 are coupled to the primary winding 21 of an output transformer 22 the secondary winding 23 of which is coupled to a suitable output load 24 which may, for example, constitute the input impedance of an additional stage of intermediate frequency amplification or of the modulation detector or so-called second detector of a superheterodyne AM or FM radio broadcast receiver. A steady state bias voltage source, here schematically represented as a battery 25, is coupled between the ends of element 17.

As thus far described, the solid state acoustic amplifier of FIGURE 1 may be entirely conventional and, in its general aspects, the device operates in a known way to provide input signal amplification. The input signal from source 10 induces mechanical vibration of input transducer 16 which in turn transmits such vibration to piezoelectric semiconductive element 17. The resulting mechanical wave vibrations are transmitted through the piezoelectric semiconductive medium and are in turn imparted to output transducer 18 where they are converted to an electrical output signal for application to load 24. Because of the presence of the steady state bias voltage from source 25, the output developed across load 24 is an amplified version of the input signal applied from source 10.

In accordance with the present invention, piezoelectric semiconductive wave propagating device or element 17 is of a special segmented construction, and input and output transducers 16 and 18 are constructed so as to impart flexural-mode, rather than compressional mode, vibration to the element. More particularly, rather than being composed of a continuous elongated single-crystal bar, element 17 is composed of two transversely juxtaposed bars or segments 26 and 27 of opposite crystallographic orientation in the direction of wave propagation. Most conveniently, the appropriate construction is achieved by longitudinally splitting a single elongated crystal bar and then longitudinally reversing the lower segment relative to the upper one; that is, one of the two segments is turned end for end.

The desired mechanical continuity between bars 26 and 27 is maintained by cementing the two segments together as indicated by the presence between the two of a layer 28 of insulating cement or the like. The desired reverse crystallographic orientation of the two segments is indicated by the presence of the oppositely directed arrows in the drawing. As used herein, "longitudinal" refers to the direction along the elongation axis of element 17, in which direction the acoustic waves propagate from one end to the other of the device, and "transverse" refers to the direction across the width of element 17 from one of its segments to the other.

The active elements of input and outut transducers 16 and 18 may also be of segmented construction, each being similarly composed of two transversely juxtaposed sub-elements of overall transverse dimensions similar to the transverse dimensions of element 17 and having oppositely directed crystallographic axis such that similarly directed longitudinal electric fields produce opposite mechanical strain. To provide maximum coupling to element 17, the length of the transducers is half the average flexural wavelength of an acoustic wave propagating in element 17 or an integral multiple thereof. When the active transducer elements are formed of natural crystal such as quartz, they too may be constructed by segmenting a single crystal and longitudinally reversing the polarity of the lower sub-element relative to the upper one. Alternatively, the active element of transducers 16 and 18 may be formed of a synthetic piezoelectric material such as polycrystalline barium titanate or the like which is pre-polarized, in known manner, in opposite directions within the upper and lower portions respectively; in this event, as illustrated, physical segmenting of the active transducers elements is not required.

Element 17 as shown is supported by thin C-shaped clamps *30a* and *30b* at its input end and clamps *30c* and *30d* at its output end. While such clamps tend to damp the flexural-mode vibration, they are constructed so as to be in contact only with very small areas or points on the major faces of element 17 as a result of which flexural waves are propagated in the element with minimal attenuation. In certain applications, it is extremely useful for tuning purposes to so position the clamps that signals at selected undesired frequencies receive additional damping. In practice, because of the thinness of element 17, the clamps physically would be relatively much larger than element 17, but the area of contact would be limited at least to a knife edge.

Further in accordance with the invention, the device includes tuning means for varying its frequency response. Preferably, as shown in FIGURE 1, the tuning means comprises means for varying the bias voltage impressed across the length of the element 17, and, in its simplest form, constitutes a variable resistor 29 connected in series with battery 25.

In a typical fabrication of the device, an electrode layer, for example of gold, is evaporated onto one transverse face of each of active transducer elements 14 and 18. A conductive layer, such as indium, is evaporated onto the opposed faces, and a similar conductive layer is evaporated onto the input and output faces of element 17. The indium is heated to a temperature just below its melting point and the active transducers are mechanically bonded to the input and output ends of element 17 by pressing the heated indium layers together and then allowing them to cool.

In operation, an acoustic wave, travelling through the piezoelectric semiconductive medium, generates an alternating longitudinal electric field travelling at the acoustic wave velocity. The field, being nonuniform, induces the formation of periodic bunches of electric charge throughout the medium. As a result of the application of the DC bias voltage across the medium, the electric charge bunches are augmented by charge carriers in response to the alternating electric field. The augmented field in turn reacts upon the piezoelectric medium causing additional acoustic wave components. When the drift velocity of the carriers exceeds the velocity of an acoustic wave in the medium, the acoustic wave is amplified. At one steady state bias voltage, inducing a corresponding drift velocity of the charge carriers, maximum amplification of the acoustic wave occurs.

In more detail, when a signal from source 10 is coupled across transducer 16, one sub-element of the transducer 16 contracts while the other sub-element expands in the transverse direction. This action impresses counter-phased acoustic waves on element 17, producing flexural-mode vibrations which propagate in the element longitudinally. At the output end of element 17, transducer 18 is subjected to the counter-phased acoustic waves which produce electric fields similarly directed to those in transducer 16. By coupling this electric field signal through transformer 22, a signal voltage is impressed across load 24. With source 25 so oriented that it produces a flow of charge carriers in the direction of propagation of the acoustic wave and with the bias voltage of sufficient magnitude, the acoustic wave is amplified.

In conventional compressional-mode acoustic wave amplifiers, the bias voltage necessary to produce amplification is such that very large power dissipation within the amplifying material, on the order of one hundred watts per cubic centimeter, is not uncommon. The phase velocity of a flexural-mode acoustic wave as here employed, however, is proportional to the square root of the frequency, and for low frequencies this phase velocity may be lower than the velocity of sound in an unrestricted medium. Since, at a constant carrier concentration, the power dissipated per unit volume of the crystal is proportional to the square of the drift velocity, a lowering of the drift velocity, made possible by the reduced acoustic wave velocity, results in reduced heating of the crystal.

Furthermore, it is often useful, for example in an intermediate frequency amplifying stage of an AM or FM receiver, for an amplifier to be tunable. That is, it is desirable that the amplifier be capable of amplifying a particular frequency more than it amplifies other frequencies. The acoustic wave velocity in the flexural-mode varies significantly with frequency change, while the acoustic wave velocity is approximately constant with frequency change for compressional-mode and shear-mode waves. Therefore, with flexural-mode amplification, at a given bias voltage producing a certain drift velocity, only waves of a particular frequency receive maximum amplification while waves of other frequencies either receive less amplification or are attenuated. Consequently, adjustment of variable resistor 29 varies the carrier drift velocity and this, in turn, determines the particular frequency of desired maximum amplification. Hence, the amplifier is tunable.

Figure 2:
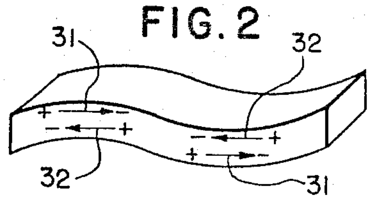
FIGURE 2 is a perspective view of a conventional flexural-mode wave-propagating crystal.

The mere concept of using the flexural-mode in acoustic amplifiers is known. Such an amplifier has been suggested in an article entitled, "On a Possibility of Amplification of Flexural Waves," by Pustovoit and Gertsenshtein which appeared in Soviet Physics-Solid State, vol. 6, No. 3, September 1964. The calculations in that article demonstrate the feasibility and certain advantages of a flexural-mode amplifier, as such. The kind of active element there discussed is depicted in FIGURE 2 wherein a piezoelectric semiconductive bar, such as cadmium sulfide, is shown in an exaggerated flexural-mode condition. FIGURE 2 also depicts by arrows the existence of stretched regions 31 opposite compressed regions 32 as viewed in a longitudinal plane. The arrow heads indicate the relative directions of the electric fields produced piezoelectrically by these opposite mechanical strains.

For the flexural-mode condition, as indicated by the + and − signs in FIGURE 2, polarization charge bunches of opposite polarity exist transversely opposite one another in a given longitudinal plane through the material. Previous analyses, including that in the aforementioned Soviet effort, neglected to observe and account for the effects from this charge configuration which, because of the tendency of the opposed charges to attract and neutralize and because of the transverse electric field between the opposing charge bunches, weakens the utilized longitudinal electric field.

Figure 3:
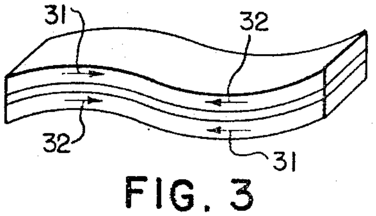
FIGURE 3 is a perspective view of a wave-propagating crystal embodying the teachings of the present invention.

The modified element shown in FIGURE 3 is a crystal of the longitudinally segmented and mutually reversed kind employed in FIGURE 1 in accordance with the invention. The represented flexural-mode action again is exaggerated. As in FIGURE 2, the extensional strain regions 31 are opposite the compressional strain regions 32. However, as indicated by the arrows, the polarity of the respective electric fields produced by each pair of transversely adjacent strains are the same. That is, the reversal in crystallographic orientation of bars 26 and 27 in FIGURE 1 causes the electric fields in both of these sub-elements of the material to be similarly polarized under opposite-type mechanical strain. Consequently, charge bunches in a given transverse plane are of similar polarity in both bars. Thus, the use of the segmented construction for element 17 minimizes or overcomes the previously-mentioned problems of the prior otherwise-similar flexural-mode amplifiers.

Figure 4:
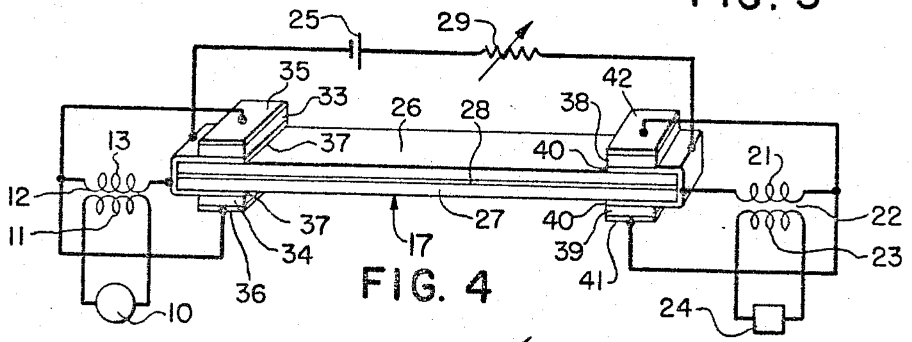
FIGURE 4 is a partly schematic perspective view of another embodiment of a flexural-mode acoustic amplifier.

In the modification shown in FIGURE 4, source 10 is coupled across opposed surface electrodes 35 and 37 of piezoelectric input transducer 33 and, in parallel, across the opposed surface electrodes 36 and 37 of a piezoelectric input transducer 34. Input transducers 33 and 34 are mechanically coupled to opposed surfaces near one end of element 17 which essentially is otherwise the same as in FIGURE 1. At its output end piezoelectric output transducers 38 and 39 are similarly coupled on respective opposed surfaces. Output electrode pairs 40, 42 and 40, 41 affixed to opposed surfaces of transducers 38 and 39 are coupled in parallel to load 24. As in the device of FIGURE 1, battery 25, in series with resistor 29, is coupled between the ends of element 17.

The operation of this device is similar to that of the device of FIGURE 1 and acoustic waves impressed upon element 17 are amplified in the manner previously explained. In element 17, therefore, the flexural-mode vibrations develop longitudinal electric fields and the acoustic waves propagate in that direction. However, the method of launching and recovering the acoustic waves is different. Specifically, transducers 33, 34, 38 and 39, again of lengths corresponding to a half wavelength or multiple thereof, are piezoelectric materials so oriented that the transverse electric fields induced between the surface electrodes produce corresponding mechanical strains. At the input end, transducers 33 and 34 receive oppositely directly electrical signals and produce oppositely directed mechanical strains which are transmitted to element 17. With the transducers mechanically coupled to element 17, a flexural-mode acoustic wave propagates in the element. Output transducers 38 and 39, of course, receive the mechanical strains and convert them to an electric signal which is coupled across load 24.

Each of the transducers in the FIGURE 4 device are prepared and affixed in the manner described for the transducers of the device of FIGURE 1. The surfaces of the transducers upon which the electrodes are mounted are perpendicular to the direction of the electric field in order to produce the maximum transverse strain in the piezoelectric transducer. At the input and ouput ends, respectively, indium layers 37 and 40 are electrically and physically continuous, extending over the ends of element 17 as shown.

Figure 5:
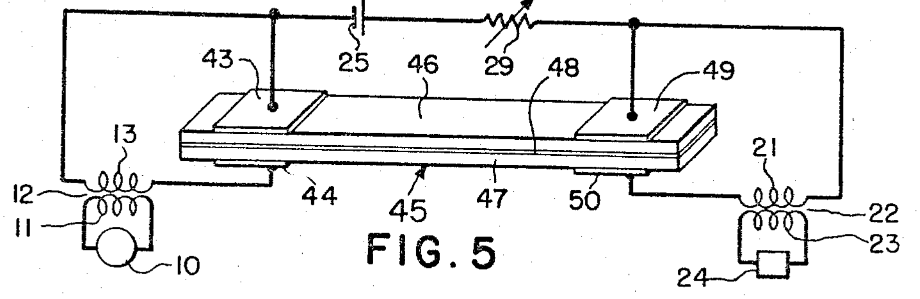
FIGURE 5 is a partly schematic perspective view of an alternative embodiment of flexural-mode acoustic amplifier.

In the embodiment of FIGURE 5, the need for separate input and output transducers is eliminated. In this case, source 10 is coupled to one end of an elongated element 45 of piezoelectric semiconductive material through electrodes 43 and 44, each of a length corresponding to a half wavelength as before and mechanically coupled directly to opposed longitudinal surfaces of element 45. Similarly, the output end of element 45 is mechanically coupled directly to electrodes 49 and 50, of similar length and affixed on the same longitudinal faces. As before, the length of element 45 is large relative to the acoustic wavelength in the semiconductive material. Also in the same way as before, output electrodes 49 and 50 are coupled across load 24 and, for tuning, battery 25 is in series with variable resistor 29 and is coupled between the input and output ends of element 45 by means of electrodes at opposite ends.

As in FIGURES 1 and 4, element 45 is a longitudinally-segmented piezoelectric semiconductive material. However, in this case the orientation between the segments is different as is the input mechanism. More particularly, element 45 is composed of two transversely juxtaposed bars 46 and 47 of mutually opposite crystallographic orientation in a direction transverse to that of the wave propagation and parallel to the direction of the electric field induced by surface electrodes 43, 44 and 49, 50. Such construction is achieved by longitudinally splitting a single elongated crystal bar and transversely reversing the lower segment relative to the upper one; stated differently, one of the segments is turned over about its longer axis. As before, mechanical continuity is attained by cementing the two segments together with a layer 48 of insulating cement.

Operation of the FIGURE 5 device is, in principle, similar to that of the device of FIGURES 1 and 4. That is, acoustic waves longitudinally propagating in bars 46 and 47 interact with charge carriers caused to drift by bias source 25. In the devices of FIGURES 1 and 4, however, the electric field produced in the piezoelectric semiconductive medium is longitudinal, i.e., parallel to the direction of propagation of the acoustic wave. However, it is known for piezoelectric crystals, per se, that the predominant directional relationship between the field and the strain is selectable by means of the choice of crystalline axial orientation where the element is cut from the original crystal body. Consequently, the FIGURE 5 embodiment utilizes for element 45 a material which is so selected and cut as to produce such transverse strain in response to a transverse field and vice versa, as is the case with the transducers in FIGURE 4. The acoustic waves, therefore, are propagated longitudinally as a result of the transverse electric fields applied to the medium.

Thus, source 10 impresses a signal across element 45 by means of the electrodes 43 and 44. The acoustic waves propagate longitudinally along the bar until the accompanying transverse electric fields produce a voltage across load 24 by way of electrodes 49 and 50. The acoustic waves produced are of the flexural-mode variety in consequence of having selected the orientations so that the similarly directed fields in sub-elements 46 and 47 produce oppositely directed mechanical strains. This is, in this case, achieved by the reversal of segments 46 and 47 in the transverse crystallographic direction parallel to the direction of the predominant electric field. Alternatively, element 45 may be segmented and electrodes 43, 44 and 49, 50 so placed on element 45 that the segments exhibit opposite mechanical strain in response to the development of oppositely directed transverse electric fields in each of the respective segments.

Figure 6:
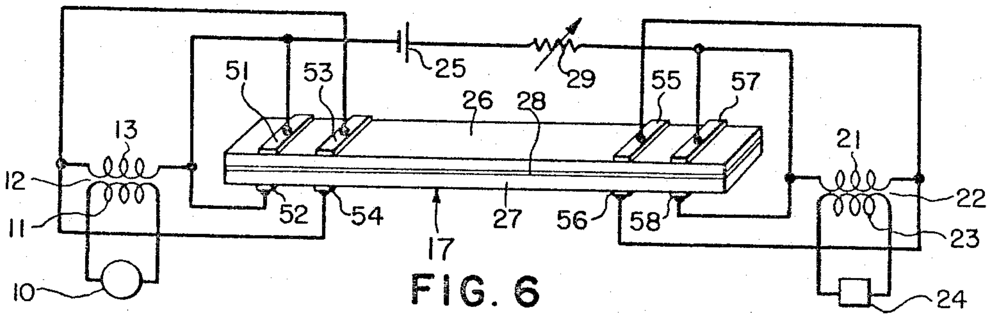
FIGURE 6 is a partly schematic perspective view of still another embodiment of the present invention.

FIGURE 6 illustrates an embodiment again using element 17 segmented, arranged and mutually oriented as in FIGURES 1 and 4, but advantage is taken of a different input and output mechanism. In this case, two pairs of opposing thin electrodes 51, 52 and 53, 54 are spaced longitudinally apart on the respective active surfaces near the input end of element 17, and two similarly arranged pairs of electrodes 55, 56 and 57, 58 are disposed near its output end. Source 10 is coupled between the longitudinally adjacent electrodes of each of the two pairs of electrodes at the input end and load 24 likewise is coupled between the two electrode pairs at the output end. onsequently, the signal from source 10 develops like-polarity longitudinal electric fields in each of segments 26 and 27 of element 17, and such fields act reciprocally to induce an output signal which is fed to load 24. The distance between the two electrode pairs at each end is half the average acoustic wavelength or a multiple thereof as before. Battery 25, in series with a variable resistor 29, is coupled between the ends of element 17 to enable tuning.

The device of FIGURE 6 is similar in operation to the device of FIGURE 1. Flexural-mode vibrations induce charge bunches in bar 17 which interact with the charge carriers induced to movement by source 25 and the interaction produces amplification of the acoustic vibrations. In this case, however, element 17 itself serves as the transducer for the flexural-mode acoustic wave as in the case of the FIGURE 5 device. As compared with the latter, on the other hand, the fields developed in element 17 are longitudinal instead of transverse. More specifically, like-polarity longitudinal electric fields are produced between electrodes 51 and 53 and between electrodes 52 and 54, respectively. The segmented construction and the mutual orientations of the bars produce opposing mechanical strains in bars 26 and 27 in response to these like-polarity electric fields. The fields, created in turn by the signal from the source 10, cause a flexural wave corresponding to the signal to propagate along device 17 to the output pairs of electrodes 55 and 57, and 56 and 58. The opposed mechanical strains in bars 26 and 27 produce like-polarity electric fields between these pairs of output electrodes and induce the output signal which is impressed across load 24.

To enable a perhaps better grasp of the capabilities of apparatus constructed according to the present invention, a brief look at typical parameter values in one exemplary structure is helpful. Specifically in a device like that of FIGURE 6, wave propagating element 17 is made from a slab of crystalline cadmium sulfide material two inches in length and having a resistivity of $1\times10^5$ ohm-centimeters. The two segments of the original crystal slab are each lapped and etched to a height of 0.002 inch and width of 0.100 inch. At a frequency of 10.7 megacycles, the flexural wavelength is 0.191 millimeter, as noted previously. The electrodes are conductive material evaporated in thin strips. Constructed in the manner described, the design gain, at the frequency of 10.7 megacycles, is 39 db.

Thus, the present invention provides new and improved solid state acoustic amplifier apparatus which affords substantial advantages over prior art devices. These amplifiers are frequency selective and easily tunable so to make them feasible for use in such applications as in miniaturized intermediate frequency amplifying stages.

A primary advantage in segmenting the active element in flexural-mode acoustic amplifiers stems from the altered configuration of the charge distribution that accompanies the acoustic wave in the amplifier. In the apparatus of FIGURES 1, 4, and 6, as previously noted, the predominant electric field is utilized and it is aligned parallel to the acoustic wave direction and propagation. However, the properties of the crystalline material may be such that electric fields are simultaneously developed in two or, perhaps, three directions in response to strain in a single direction. Since a reversal of the orientation of one segment relative to the other can involve a reversal of activity orientation in two directions, benefit may accrue to a particular application by taking advantage of differences in the magnitude of activity as between the different directions and so mutually orienting the characteristics of the two segments as to emphasize desired coupling modes and, at the same time, to attenuate undesired coupling modes.

While particular embodiments of the invention have been shown and described, it will be obvious to those skilled in the art that changes and modifications may be made without departing from the invention in its broader aspects, and, therefore, the aim in appended claims is to cover all such changes and modifications as fall within the true spirit and scope of the invention.

I claim:

1. A flexural-mode solid-state acoustic signal translating device comprising:

an acoustic wave propagating element of piezoelectric semiconductive material and of a length in the direction of acoustic wave propagation which is large relative to the wavelength in said material of the translated acoustic waves and composed of a pair of juxtaposed piezoelectric semiconductive segments in transverse juxtaposition relative to said direction of wave propagation;

means coupled to said element and responsive to an input signal for impressing acoustic waves on said segments to induce flexural mode vibration of said element with resultant development of bunches of electric charge in like phase in transversely aligned regions of said segments;

means coupled to said element and responsive to said flexural mode vibration for developing an output signal corresponding to said input signal;

and means for impressing a steady state bias voltage across said element in said direction of wave propagation to establish a flow of electric charge carriers in said material, in said direction of wave propagation, to interact with said bunches of electric charge and modify the amplitude of said flexural mode vibration.

2. A device according to claim 1 which includes tuning means for varying the frequency response of said element.

3. A device according to claim 2 in which said tuning means comprises means for varying the value of said bias voltage.

4. A device as defined in claim 1 in which said input-signal-responsive means simultaneously impresses counter-phased acoustic waves on said segments.

5. A device according to claim 1, in which said piezoelectric semiconductive material exhibits a predetermined acoustic wave propagation velocity and said flow of charge carriers moves at a velocity greater than said predetermined velocity.

6. A device according to claim 1 wherein said segments mutually are different in crystallographic orientation respectively to develop oppositely directed strains in response to said input signal.

7. A device according to claim 6 in which said segments mutually are longitudinally opposed in crystallographic orientation.

8. A device according to claim 6 in which said segments mutually are transversely opposed in crystallographic orientation.

9. A flexural-mode solid state acoustic signal translating device according to claim 6 in which said input-signal-responsive means comprises an electromechanical input transducer and in which said vibration-responsive means comprises an electromechanical output transducer.

10. A device according to claim 6 in which said input signal-responsive means includes a pair of electromechanical transducers disposed on transversely opposed surfaces of said element.

11. A device according to claim 6 in which said input-signal-responsive means includes an electromechanical transducer coupled to one end of said element and which develops electric fields in a direction parallel to the propagation direction of said waves.

12. A device according to claim 6 in which said input-signal-responsive means comprises a pair of surface electrodes on said element.

13. A device according to claim 6 in which said input transducer initiates propagation of said acoustic wave longitudinally in said element and said wave propagates within said element in a direction parallel to the predominant electric field in said segments.

14. A device according to claim 6 in which said input-signal-responsive means includes a longitudinally-spaced pair of electrodes disposed on each of a pair of transversely opposed surfaces of said element, said electrodes developing electric fields in a direction parallel with the propagation direction of said waves.

15. A device according to claim 6 in which said input-signal-responsive means includes a pair of electrodes individually disposed on opposing surfaces of said element, said electrodes devleoping electric fields in a direction transverse to the propagation direction of said waves.

No references cited.

ROY LAKE, *Primary Examiner.*

D. R. HOSTETTER, *Assistant Examiner.*